United States Patent [19]

Salloum et al.

[11] 4,328,368

[45] May 4, 1982

[54] METHOD FOR RECLAIMING POLYURETHANE FOAM

[75] Inventors: Robert J. Salloum, Troy; Clifford C. Duff, Warren, both of Mich.

[73] Assignee: General Motors Corporation, Detroit, Mich.

[21] Appl. No.: 146,760

[22] Filed: May 5, 1980

[51] Int. Cl.³ .............. C07C 87/50; C09B 11/02; C07C 43/11; C07C 43/20; C07C 85/02; C07C 85/24; C07C 85/20; C07C 85/153

[52] U.S. Cl. .................. 564/393; 560/26; 560/91; 560/198; 564/305; 564/330; 564/414; 564/452; 564/463; 564/487; 564/488; 564/511; 568/613; 568/620; 568/621; 568/624; 568/675; 568/716; 568/840; 568/851; 568/852; 568/853; 203/95; 260/453 A; 260/453 AR; 260/704; 260/705; 264/37; 422/232; 422/239; 521/53; 521/63; 521/918

[58] Field of Search ............ 564/393, 414, 330, 331; 203/95

[56] References Cited

U.S. PATENT DOCUMENTS

| | | | |
|---|---|---|---|
| 70,956 | 11/1867 | Cashwell | 203/95 |
| 2,067,938 | 1/1937 | McBurney et al. | 568/340 |
| 3,225,094 | 12/1965 | Wolf | 260/705 X |
| 3,404,103 | 10/1968 | Matsudaira et al. | 564/393 X |
| 3,441,616 | 4/1969 | Pizzini et al. | 560/198 X |
| 3,478,099 | 11/1969 | Ross et al. | 260/347.7 X |
| 4,025,559 | 5/1977 | Johnson | 564/393 |
| 4,039,568 | 8/1977 | Sakai et al. | 564/414 X |
| 4,051,212 | 9/1977 | Grigat et al. | 564/414 X |
| 4,082,366 | 4/1978 | Duff et al. | 302/11 |
| 4,196,148 | 4/1980 | Mahoney | 564/393 X |

*Primary Examiner*—John Doll
*Attorney, Agent, or Firm*—E. F. Harasek

[57] ABSTRACT

A method if provided for continuously hydrolyzing urethane foam in a vertically oriented hydrolysis reactor. In a preferred practice, a bed of foam particles is formed in the reactor. Superheated steam is flowed continuously upward through the bed at a temperature and rate such that only the foam particles then adjacent the bottom of the reactor are hydrolyzed and the bulk of the bed is not fluidized. Unreacted steam heats the unhydrolyzed foam. Liquid hydrolysis products are drained as they are formed to prevent hydrolysis-impeding liquid saturation of unhydrolyzed particles.

3 Claims, 3 Drawing Figures

METHOD FOR RECLAIMING POLYURETHANE FOAM

BACKGROUND OF THE INVENTION

This invention relates to a process for hydrolyzing urethane foam particles in a continuous manner to recover polyols and other chemicals. The invention is particularly applicable to the hydrolysis of polyurethanes such as polyether polyurethane from which liquid polyols can be recovered.

The low density and chemically resistant nature of scrap urethane foam has heretofore made it commercially unappealing to recover chemicals from it. Thus, scrap foam has generally been disposed of in land fills. It would be more desirable to recycle scrap foam if an economical and practical process and apparatus were available.

U.S. Pat. Nos. 4,025,559 to Johnson (filed Dec. 18, 1972; issued May 24, 1977) and 4,082,366 to Duff and Salloum (filed Mar. 18, 1977; issued Apr. 14, 1978), the latter assigned to the assignee of this invention, suggest the use of horizontally oriented reactors to hydrolyze scrap urethane foam. However, we have found that horizontal reactors are impractical for this application. In a paddle-type reactor, such as that shown in U.S. Pat. No. 4,082,366, the liquid polyol formed by the hydrolysis reaction contacts the unhydrolyzed foam particles and creates a slush. The slush is highly resistant to steam hydrolysis and the reaction proceeds too slowly to be practical. U.S. Pat. No. 4,025,559 relates to a horizontal reactor wherein the particles are transported through successive, screened, reaction zones by pneumatic means. The system requires an appreciable amount of energy just to maintain the particles in a fluidized state without plugging the screens. Moreover, the reactor is unsuited for processing urethane foams filled with any type of non-hydrolyzable particulate or thermo-plastic constituent. Such residue would quickly plug the reactor.

The use of open mesh baskets to retain urethane foam particles in contact with superheated steam is also known. However, this method, like those used to operate horizontal reactors, allows polyol from the hydrolysis reaction to soak into the remaining, unreacted, foam particles and retard their hydrolysis. Moreover, this is a batch rather than a continuous process.

OBJECTS OF THE INVENTION

It is an object of this invention to provide a continuous method of hydrolyzing urethane foam particles in a vertical reactor to recover chemicals therefrom.

A more particular object is to hydrolyze urethane foam in a manner to directly recover liquid polyol that may be recycled without chemical modification to make urethane foam by reaction with suitable isocyanates.

A more specific object is to provide a method of forming a vertical bed of urethane foam particles and flowing superheated steam upwards through it at a temperature and rate such that only particles at the bottom of the bed are hydrolyzed and the remaining particles are heated by unreacted steam. Another specific object is to provide a method of admitting steam into such a reactor through perforations in a plate at the bottom thereof to progressively hydrolyze that portion of the particles adjacent the bottom. Another specific object is to provide a method of hydrolyzing urethane foam in a manner such that liquid hydrolysis products are drained from the hydrolysis zone of the reactor (through a portal separate from the steam inlet perforations) as they are formed. Such draining prevents hydrolysis-impeding liquid saturation of unhydrolyzed particles remaining in the reactor.

Another object is to provide a method wherein urethane foam particles may be added to the top of a continuously operating vertical reactor to replace particles hydrolyzed at the bottom.

A more particular object is to provide a continuous method of hydrolyzing urethane foam that is not adversely affected by the presence of unhydrolyzable filler in the foam.

BRIEF SUMMARY OF THE INVENTION

In accordance with a preferred embodiment of the invention, a bed of urethane foam particles is introduced into a hydrolysis reactor. Superheated steam is admitted to the reactor through perforations in a foam retaining plate at the bottom. Because the reaction medium (steam), is admitted into the reactor only at the bottom, it is said to be "vertically" oriented. The steam is fed at a temperature and a rate such that only particles adjacent the bottom plate are hydrolyzed, generally in less than about ten seconds at steam temperatures of 300°–375° C. The unreacted steam travels upward through the balance of the particles of the bed, preheating them for hydrolysis. As the foam particles at the bottom are hydrolyzed, more particles are added near the top of the chamber and the bed is incremented generally downward.

The liquid polyol reaction product of the foam hydrolysis is continuously drained through an outlet adjacent the bottom plate. It does not soak into the foam particles remaining in the reactor chamber nor pass through the steam inlet perforations. Excess steam and the gaseous reaction products are exhausted from the chamber through an outlet near the top of the reactor and collected. Any hydrolyzed solids residue collects on the bottom plate.

A suitable reactor operated in this manner can continuously and efficiently reduce large amounts of scrap foam to useful chemicals including polyols and diamines.

DETAILED DESCRIPTION OF THE INVENTION

Our invention will be more clearly understood in view of the following figures and examples relating to preferred embodiments.

IN THE DRAWINGS

Figure 1:
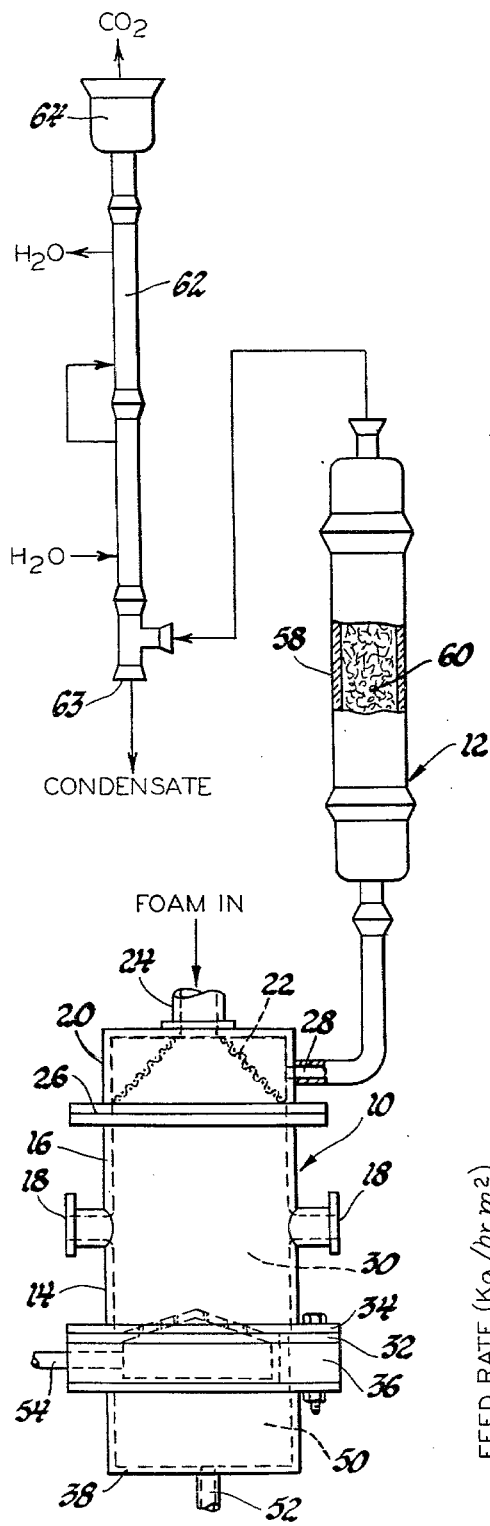
FIG. 1 is a representation of a hydrolysis reactor and attached condenser suitable for the practice of the invention.

With respect to FIG. 1, a preferred hydrolysis apparatus 10 is shown with an attached apparatus 12 for filtering gaseous reactor effluent. This apparatus is suited for continuously hydrolyzing styrene acrylonitrile (SAN) filled polyether based polyurethane foam.

Figure 2:
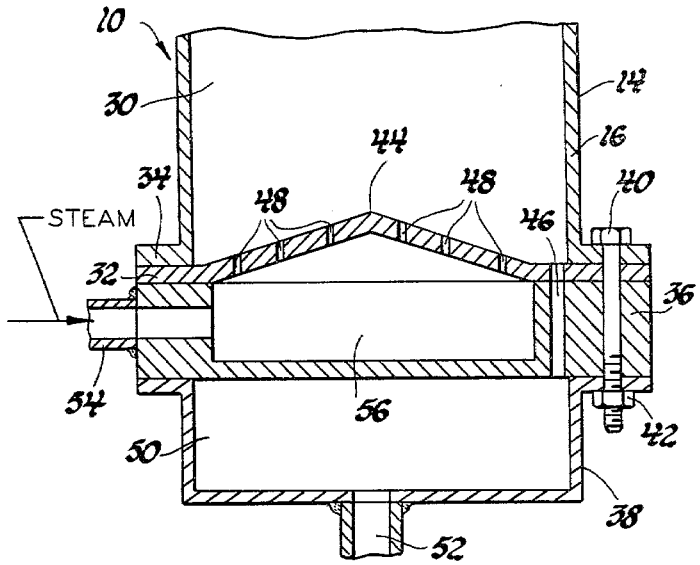
FIG. 2 is an enlarged sectional view of the bottom portion of the reactor of FIG. 1 showing the perforated bottom plate and adjacent polyol outlet.

As seen at FIG. 2, the reaction chamber body 14 has a generally cylindrical shape defined by wall 16. Viewports 18 are provided midway down the chamber through wall 16. A generally conical screen 22 is provided at the top of the chamber. Screen 22 slopes downwards from foam inlet conduit 24 to flange 26 of chamber body 14. Screen 22 prevents foam particles from blowing out of chamber 14 into filtering apparatus 12.

In accordance with our method, the urethane foam is preferably provided in a shredded state, the particles being small enough to be pneumatically transported through conduit 24. Small batches of particles are preferably intermittently introduced into the chamber by means of a feeding apparatus of the type described in U.S. Pat. No. 4,082,336 (not shown).

Outlet 28 for exhausting volatile reaction products and steam from reaction chamber 30 is incorporated in wall 16. As seen in greater detail at FIG. 2, perforated bottom plate 32 is hermetically sealed and attached to bottom flange 34 of chamber wall 16, steam inlet housing 36, and sump housing 38 by means of bolts 40 and nuts 42. Bottom plate 32 is pitched from center 44 downwards to promote drainage of liquid reaction products through adjacent canal hole 46. Canal hole 46 drains through steam inlet housing 36 and empties into sump 50 where it may be drained through sump outlet 52. Perforations 48 in bottom plate 32 are sized to admit superheated steam into reaction chamber 30 at velocities high enough to prevent backflow of liquids therethrough and to hydrolyze adjacent foam particles. The superheated steam is transported from a boiler and superheater (not shown) through conduit 54 into chamber 56 up through bottom plate perforations 48. The steam diffuses through perforations 48 under positive pressure. Excess steam, carbon dioxide, volatile reaction products and any entrained particulates, principally diamine, are exhausted through gas outlet 28 to filtering apparatus 12. This apparatus is made up of a cylinder 58 packed with Pyrex$^R$ glass filter fibers. Fiber filter 60 traps diamine particulates. Water-cooled condenser 62 condenses most of the steam and vapors escaping from packed cylinder 58 and condensate drains through outlet 63. Diamine is preferably recovered from filter 60 and the condensate of condenser 62. A final filter 64 is provided above condenser 62 to trap any remaining wet diamine. We have found that it is most advantageous to keep the glass fiber filter packings 60 and 64 moist.

The shredded foam used in the processes and apparatus described herein was a closed-cell, thermoset polyether-polyurethane with an average density of about two pounds per cubic foot. In the shredded state, the apparent foam density was about five pounds per cubic foot. The foam particles were preferably less than one inch in diameter so they would not hang up in the feed tubes. Particle size is not critical to the invention and depends primarily on the size of the transport conduits in the apparatus.

The foam itself was of the type used to make automotive seat buns. It is the reaction product of styrene acrylonitrile modified polyether polyol constituent, toluene diisocyanate, and less than about 10 weight percent other constituents such as blowing agent, fire retardant, surfactant, catalyst and silicone. The polyol constituent was made up of hydroxy terminated polyethers, $\overline{M}w$ about 4,000–7,000 with a functionality greater than two. About 50–70 weight percent of the polyol was modified with grafted styrene acrylonitrile (SAN) polymer. The SAN acts as an integral filler to improve the physical properties of the foam.

In accordance with a preferred practice of the method, urethane foam was hydrolyzed in an apparatus like that shown in the figures. A bed of shredded urethane foam particles was delivered into reactor chamber 30. The foam was observed to fall freely from the top of the reactor towards the bottom plate through viewports 18. Introduction of the particles was timed through the hydrolysis run so that chamber 30 remained substantially full of particles; i.e. enough particles were intermittently added to the upper portion of the stacked bed to compensate for the particles hydrolyzed at the bottom of the reactor chamber.

Superheated steam was introduced into reactor chamber 30 through perforations 48 in the bottom plate 32. The steam temperature was maintained above the hydrolysis temperature of the foam, about 300° C., preferably between about 300°–375° C. The steam was added at a rate such that only the particles most adjacent the bottom plate 32 were hydrolyzed. Unreacted steam diffused upward through the reactor chamber heating the remaining foam particles. The particles entered the reactor substantially at room temperature, but were heated to a temperature close to the hydrolysis temperature by excess steam as they progressed downward through the reactor. The perforations in a suitable bottom plate were sized to allow steam to pass upwards through them at a velocity such that liquid hydrolysis products did not drain back through. We have found that a minimum steam flow of at least about 10 and preferably 15 kilograms steam per kilogram foam in the reactor per meter squared of reactor cross-sectional area per hour is required to continuously hydrolyze foam in a zone adjacent the bottom of the reaction chamber.

In the hydrolysis of the automotive seat foam, the SAN left a foraminous residue at the bottom of the reactor chamber. The residue was black and porous. This residue did not impede the continuous and steady state hydrolysis of foam in the reaction chamber, even when the residue almost filled it. Periodically, the residue must be removed from the reaction chamber. Obviously, foam free of unhydrolyzable additives such as SAN would leave no residue when hydrolyzed in accordance with the invention.

Figure 3:
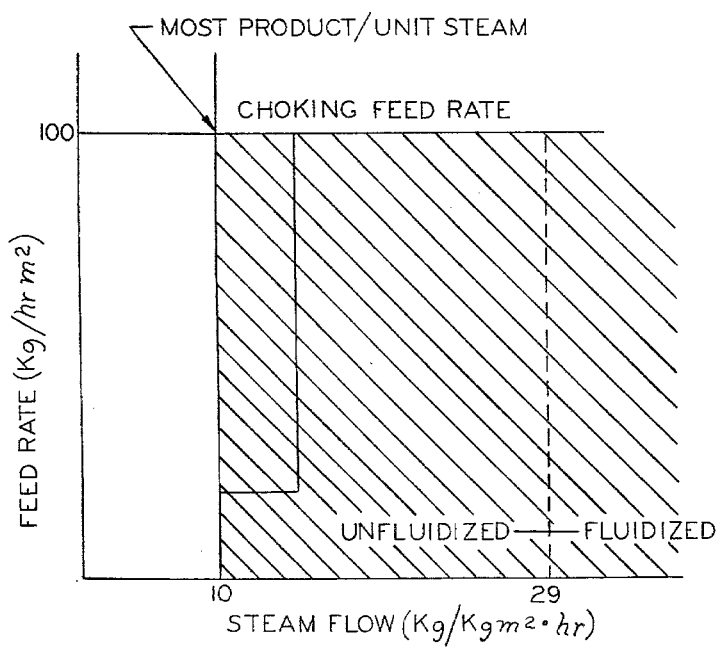
FIG. 3 is a graph of foam hydrolysis in a reactor in accordance with the invention where steam flow is the abscissa and feed rate the ordinate.

With reference to FIG. 3, the foam feed rate in kilograms per square meter cross-sectional reactor area per hour is plotted as a function of steam flow in kilograms steam per hour per kilogram foam times the area of the reactor cross-sectional surface in square meters for a vertical hydrolysis reactor operating at a steam temperature of about 316° C. The cross-hatched portion of the graph represents the operating parameters within which foam is hydrolyzed in a reaction zone at the bottom of the reactor. The choking feed rate; i.e. the rate at which the foam is added faster than it can be hydrolyzed, is a function of the steam temperature and the velocity. It is most efficient to operate a reactor at the intersection of the minimum steam rates and the minimum choking feed rates. At this point, the most foam will be hydrolyzed per unit of steam. At a steam flow rate of about 29 kg/m$^2$·h per kilogram foam, the bulk of the foam particles tends to become fluidized in the reactor chamber. Fluidization is not necessary and may even interfere with the introduction of new particles and the exhaust of effluent gases from the reactor.

The following specific examples describe two experimental reactors that were built and operated in accordance with the invention.

EXAMPLE I

A reactor of the type shown in FIGS. 1 and 2 was built with a cross-sectional reaction chamber diameter of 6 inches. The bottom plate had 1/16-inch diameter holes spaced ⅜ inch apart in a square matrix pattern. These holes served as steam inlets. Bottom plates with 2° and 30° pitches from the center towards the polyol canal hole were tried. The pitch of the bottom plate towards the polyol canal within this range did not make any measurable difference in the performance of the reactor. It is preferred to have at least a slight pitch on the bottom plate to facilitate drainage of the liquid reaction products, particularly polyol, and to prevent the impregnation of unreacted foam with polyol.

Table I sets forth information on four representative seat bun foam hydrolysis runs made with this reactor. The "feed rate" is the feed rate of foam in kilograms per hour; the "total feed" is the sum of all the foam fed during the run in kilograms; the "temperature" is the temperature of superheated steam; the "steam rate" is the amount of steam admitted into the reaction chamber in kilograms per hour; the "pressure" is the gage pressure measured near the top of the reaction chamber, averaged over the run, in kiloPascals; the "run recovery percent" is the weight ratio of the material collected in the sump divided by the total weight of foam fed into the reactor times 100 for a reactor operating at steady state. Steady state operation occurs when the steam temperature and rate are coordinated with a constant foam input so that all the foam added is hydrolyzed in a zone adjacent the bottom and the reactor does not choke; the "polyol recovery percent" is the weight ratio of substantially pure polyol recovered divided by the total weight of foam fed times 100; and the "induction time" is the time in minutes between feeding the first foam into the reactor and the appearance of polyol in the sump. Run 1 of Table I shows a total recovery of 58.4% for a total feed of 21.48 kilograms of foam particles. The material drained from the sump, the run recovery, included liquid polyol, wax (used as a mold release), a small amount of unhydrolyzed foam, SAN particles and other contaminants. At room temperature, the wax crystallized. The liquid drained from the sump was filtered at room temperature. A mixture by weight of 5% filtered and 95% new polyol produced a satisfactory seat foam when reacted with a suitable isocyanate.

TABLE I

| Run | Feed Rate kg/hr | Total Feed kg | Temperature °C. | Steam Rate kg/hr | Pressure kPa | Run Recovery Percent | Polyol Recovery Percent | Induction Time Min |
|---|---|---|---|---|---|---|---|---|
| 1 | 1.36 | 21.48 | 288 | 5.45 | 41.4 | 62.3 | 58.4 | 28 |
| 2 | 2.73 | 5.00 | 260 | 5.45 | low | 34.7 | | 35 |
| 3 | 1.36 | 5.45 | 288 | 2.73 | 41.4 | 61.3 | 63.3 | 26 |
| 4 | 1.36 | 5.45 | 316 | 5.45 | 41.4 | 60.7 | 62.5 | 11 |

Runs 2–4 show the effect of reaction chamber temperature on run recovery. Reactor heating was controlled by steam input. A steam inlet temperature of 260° C. was just inadequate to obtain any substantial foam recovery. There was little difference in the overall run recovery between runs made at steam inlet temperatures of 288° and 316° C. However, the induction time is much less and the steam flow rate higher at 316° C.

As shown at FIG. 1, TDA containing vapor effluent was collected primarily in a fiberglass filter 60. Most remaining TDA was carried in the condensate of condenser 62.

EXAMPLE II

The reactor described in FIG. 1 was scaled up to a cross-sectional diameter of 12 inches. Table II shows the results of five representative runs with the larger reactor. Run 2 is representative of an extended run with the reactor at foam feed rates of 7.3 to 9.1 kilograms per hour. The reactor was run at steady state conditions, just below the choking feed rate. When compared to the run recovery of the smaller reactor, it can be seen that the foam recovery appears to be directly proportional to the cross-sectional area of the reactor chamber. Thus the process and apparatus of this invention allow for the rapid hydrolysis of large amounts of urethane foam scrap by simply scaling up the reactor cross-sectional area. Horizontal reactors do not provide this. Run 2 shows that the reactor choked at a steam rate of 5.45 kilograms per hour. However, as seen from Runs 3 and 4, a steam rate of 10.9 kilograms per hour provided total hydrolysis of foam fed at a rate of 7.27 kilograms per hour. The run recovery was somewhat improved by operating the reactor at a pressure of 207 kiloPascals instead of 41.4 kiloPascals. The induction time at higher pressure was also shorter. However, the foam had a tendency to plug the vapor outlet at the higher operating pressure and SAN grit was carried into the sump with the polyol.

TABLE II

| Run | Feed Rate kg/hr | Total Feed kg | Temperature °C. | Steam Rate kg/hr | Pressure kPa | Run Recovery Percent | Polyol Recovery Percent | Induction Time Min |
|---|---|---|---|---|---|---|---|---|
| 1 | 7.3–9.1 | 32.73 | 316 | 10.91 | 41.4 | 61.3 | 64.1 | 9 |
| 2 | 7.27 | 16.36 | 288 | 5.45 | 41.4 | 22 | choked | |
| 3 | 7.27 | 21.82 | 288 | 10.91 | 207 | 79.5 | 79.2 | 10 |
| 4 | 7.27 | 21.82 | 288 | 10.91 | 41.4 | 64.5 | 67.3 | 24 |

Thus, we have provided an economical and efficient process and apparatus for hydrolyzing thermosetting urethane foam to recover useful chemicals. The reactor can be scaled up to rapidly hydrolyze large amounts of foam scrap. Our novel use of a vertically oriented reaction chamber has made the process practicable. Moreover, the method readily allows the adjustment of steam temperature, rate and foam feed rate to provide the best recovery rate for the energy put into the system.

While our invention has been described in terms of specific embodiments thereof, it will be appreciated that other forms may be readily adapted by one skilled in the art. Therefore, our invention is limited only by the following claims.

The embodiments of the invention in which an exclusive property or privilege is claimed are defined as follows:

1. A continuous method of hydrolyzing urethane foam particles in a vertical hydrolysis reactor to recover chemicals therefrom, comprising:

forming a bed of urethane foam particles in the reactor;

continuously flowing superheated steam vertically upward through the bed;

controlling the temperature and flow rate of the steam such that the bed is not fluidized and such that only the foam particles then adjacent the bottom of the bed are hydrolyzed while unreacted steam flows upwardly from said portion and heats the balance of the particles;

draining liquid hydrolysis products from said bed as they are formed to prevent hydrolysis-impeding liquid saturation of unhydrolyzed particles; and adding foam particles to the top of the bed to replenish it.

2. A continuous method of hydrolyzing urethane foam in a vertical hydrolysis reactor to recover reusable liquid polyol and diamine, comprising:

forming a bed of urethane foam particles in the reactor;

introducing super heated steam through perforations at the bottom of said reactor and flowing it vertically upwards through said bed;

controlling the temperature and flow rate of said steam such that only a portion of the bed adjacent the bottom of the reactor is hydrolyzed, the liquid reaction products do not drain through said perforations and the unreacted foam particles are heated to a temperature near their hydrolysis temperature by unreacted steam;

continuously draining liquid polyol from the reactor as it is formed through at least one outlet at the bottom of the reactor separate from the perforations for inletting said steam;

exhausting diamine containing vapor from said reactor and collecting said diamine in a filtering means; and adding foam particles to the top of said bed to replenish it.

3. A method of continuously hydrolyzing low density styrene-acrylonitrile filled polyether polyol based polyurethane foam particles to produce reusable liquid polyol, filler-originated residue and diamine containing vapor, said method comprising:

forming a vertical bed of said particles supported on a perforated inclined plate at the bottom of a hydrolysis reactor:

flowing superheated steam upwards through said perforations at a temperature above about 300° C.; said temperature and the flow rate of the steam being such that only a portion of said bed most adjacent said plate is hydrolyzed and liquid reaction products do not drain through the perforations:

continuously draining liquid polyol through an oulet adjacent the lowest end of said inclined plate to prevent hydrolysis-impeding saturation of unhydrolyzed foam;

causing the unreacted steam and vaporous reaction products to flow upwards through the unhydrolyzed foam to heat it to a temperature near the hydrolysis temperation thereof;

filtering the diamine particulates from said unreacted steam; and adding foam particles to the top of the bed to replenish it.

* * * * *